United States Patent

Norkey

Patent Number: 5,971,445
Date of Patent: Oct. 26, 1999

[54] QUICK CONNECT COUPLING WITH IMPROVED RETAINER

[75] Inventor: Phillip J. Norkey, Jackson, Mich.

[73] Assignee: Pilot Industries, Inc., Dexter, Mich.

[21] Appl. No.: 08/967,551

[22] Filed: Nov. 10, 1997

[51] Int. Cl.[6] ................................... F16L 39/00
[52] U.S. Cl. .......................... 285/319; 285/921
[58] Field of Search ................................. 285/319, 321, 285/397, 921

[56] References Cited

U.S. PATENT DOCUMENTS

| | | | |
|---|---|---|---|
| 2,935,340 | 5/1960 | Marie | 285/397 X |
| 4,637,640 | 1/1987 | Fournier et al. | 285/319 |
| 4,846,506 | 7/1989 | Bocson et al. | 285/4 |
| 4,875,709 | 10/1989 | Caroll et al. | 285/319 X |
| 4,902,043 | 2/1990 | Zillig | 285/319 X |

*Primary Examiner*—Dave W. Arola
*Attorney, Agent, or Firm*—Gifford, Krass, Groh, Sprinkle, Anderson & Citkowski, P.C.

[57] ABSTRACT

A quick connect coupling having a male part and a female part in which the female part includes a housing open at one end. The housing also forms a generally cylindrical internal chamber adjacent to and aligned with the open end of its housing. An annular and readily inwardly extending lip is also provided around the open end of the housing. A retainer constructed from an elongated band of a resilient material, such as spring steel is formed into a tubular cylindrical shape having a diameter at least as large as the diameter of the chamber. In addition, the band is dimensioned such that one end of the band overlies the other end of the band. A plurality of locking tabs is secured to and extend radially inwardly from the band. The retainer is radially inwardly compressible and insertable into the open end of the housing such that, after insertion, the retainer expands radially outwardly so that an outer end of the retainer is entrapped by the lip. The male part includes an elongated tube having an annular bead adjacent its one end. The end of the male part is insertable through the opening end of the female part and into the chamber such that the locking tabs engage an outwardly facing surface of the bead to thereby secure the male and female parts together.

1 Claim, 1 Drawing Sheet

QUICK CONNECT COUPLING WITH IMPROVED RETAINER

BACKGROUND OF THE INVENTION

1. Field of the Invention

The present invention relates generally to quick connect couplings and, more particularly, to a quick connect coupling with an improved retainer.

2. Description of the Prior Art

There are many types of quick connect couplings of the type used in automotive applications and the like. These previously known quick connect couplings typically comprise an elongated female part open at one end. A resilient retainer having radially inwardly projecting locking tabs is contained within the interior of the female part. Thereafter, the male part comprising a tube with an annular bead adjacent its end is insertable into the female part. Upon doing so, the locking tabs engage an outwardly facing surface of the bead to thereby retain the male and female parts together.

There have been a number of previously known methods for securing the retainer to the female part. In one type of previously known quick connect coupling, the female part includes an annular and radially inwardly extending lip formed around its open end. The retainer, which is constructed of a resilient material such as spring steel, is then inserted into the housing chamber through its open end so that, as the retainer radially expands following insertion into the female housing, an outer end of the retainer abuts against and then is trapped by the annular lip.

In one type of previously known annular retainer, the annular retainer is formed from an elongated band of resilient material, such as spring steel. Locking tabs are then stamped outwardly from the body of the spring steel and the band with the outwardly extending tabs is then formed into a tubular cylindrical shape such that the ends of the band are spaced apart from each other. The tubular retainer is then radially and inwardly compressed in order to reduce the diameter of the retainer so that it can be inserted past the retainer lip and into the interior of the female housing chamber. Following insertion, the retainer expands radially outwardly in the fashion described above.

One disadvantage of these previously known retainers, however, is that the retainers are often times deformed past their elastic limit as they are compressed in preparation for their insertion into the female housing. Such post elastic deformation, furthermore, often times occurs around the cut outs forming the locking tabs where the actual material of the band is reduced by the area of locking tabs.

When the previously know retainers are radially compressed past their elastic limit, the retainers assume an oval shape. Once released within the female housing chamber, the retainers do not return to their circular shape but instead remain oval, such that the outer ends of the retainers may not be fully entrapped by the annular lip on the female housing. When this occurs, the fluid coupling often times exhibits reduced pullout strength, improper sealing, premature failure and other disadvantages.

SUMMARY OF THE PRESENT INVENTION

The present invention provides a quick connect coupling which overcomes all of the previously known disadvantages of the prior art devices.

In brief, the quick connect coupling of the present invention comprises a male part and a female part. The female part has an elongated tubular and cylindrical housing opened at one end and forming an interior housing chamber. A radially inwardly extending angular lip is formed around the open end of the female housing.

A resilient retainer is entrapped within the housing chamber by the annular lip. The retainer comprises an elongated band constructed of a resilient material, such as spring steel, which is formed into a circular loop. Locking tabs extend radially inwardly at circumferentially spaced points around the band into the interior of the loop such that the locking tabs extend away from the open end of the female housing.

The male part comprises a elongated rigid tube having an annular bead formed around the tube adjacent a free end. The free end of the male part is insertable through the open end of the female housing and into the female housing chamber such that the annular bead deflects the locking tabs radially outwardly during insertion of the male part into the female part. Once the annular bead passes the locking tabs, the locking tabs return radially inwardly and engage an outwardly facing surface with the annular bead thus retaining the male and female parts together. Appropriate seals are provided between the outer periphery of the male part and the inner periphery of the housing chamber in the well known fashion.

Unlike the previously known retainers, however, in the present invention the band is dimensioned so that, once the retainer is formed into a circular loop, the ends of the retainer overlap each other by a relatively small amount. This overlap of the end of the band, however, is sufficient to retain the retainer in a substantially circular cross seconal shape even while the retainer is compressed radially inwardly in preparation for its insertion into the female housing. Since the circular cross sectional shape of the retainer is maintained despite radially inward compression, the retainer maintains its circular cross sectional shape following its insertion and radially outward expansion in the female housing chamber.

BRIEF DESCRIPTION OF THE DRAWING

A better understanding of the present invention will be had upon reference to following detailed description when read in conjunction with the accompanying drawing, wherein like reference characters refer to like parts throughout the several views and in which.

DETAILED DESCRIPTION OF A PREFERRED EMBODIMENT OF THE PRESENT INVENTION

Figure 1:
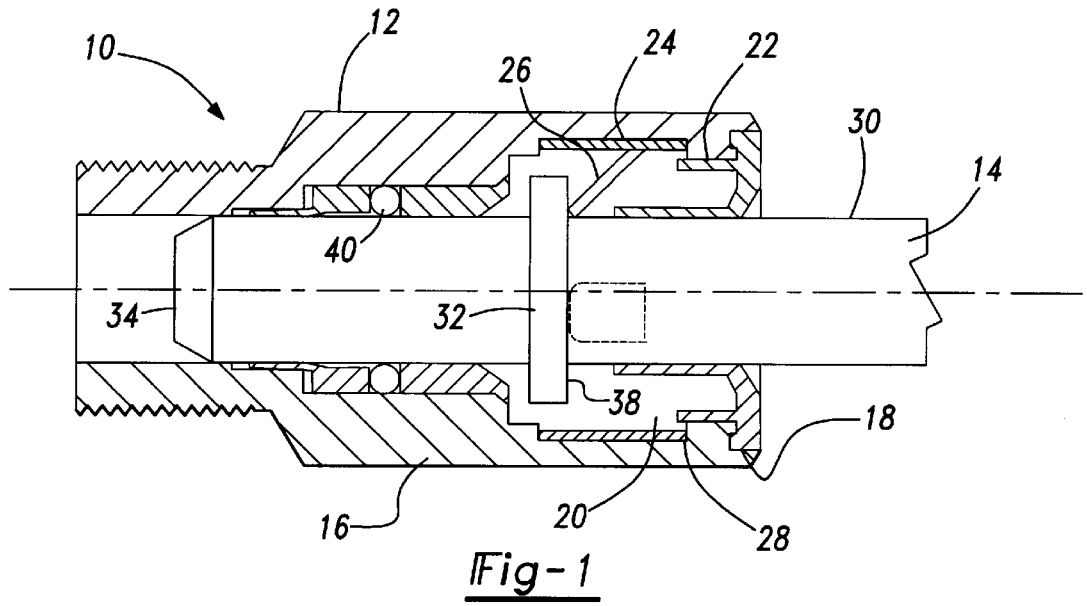
FIG. 1 is a longitudinal sectional view illustrating a preferred embodiment of the present invention.

With reference first to FIG. 1, a preferred embodiment of the quick connect coupling 10 of the present invention is there shown and comprises a female part 12 and a male part 14. The quick connect coupling illustrated in FIG. 1 is illustrated in its connected position.

Still referring to FIG. 1, the female part 12 includes a generally cylindrical and tubular housing 16 open at one end 18. The housing 16, furthermore, forms a generally cylindrical chamber 20 which is aligned with and adjacent to its open end 18. A radially inwardly extending lip 22 is formed on the housing 16 adjacent its open end 18 so that the lip 22 extends radially inwardly from the outer periphery of the chamber 20.

Figures 2, 4:
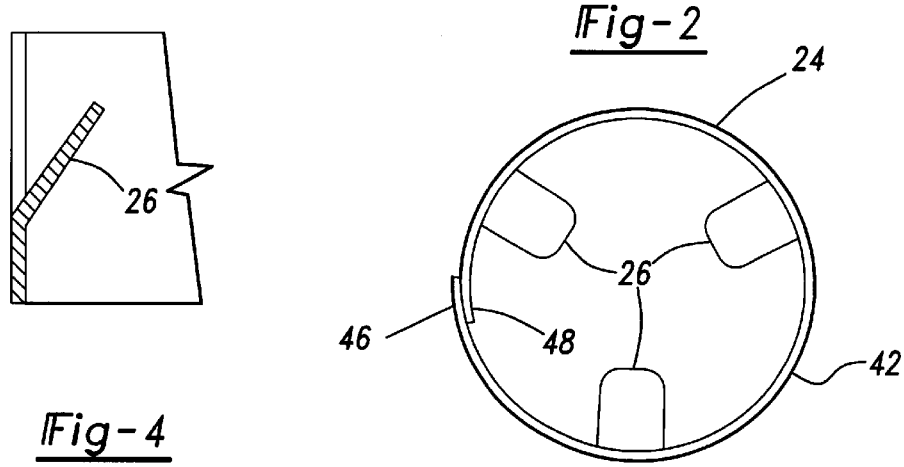
FIG. 2 is an end view illustrating a preferred embodiment of the retainer of the present invention.
FIG. 4 is a partial sectional view taken substantially along line 4—4 in FIG. 3.

With reference now to FIG. 2, an annular retainer 24 having a plurality of circumferentially spaced and radially inwardly extending locking tabs 26 is positioned within the housing chamber as shown in FIG. 1. In doing so, an outer end 28 of the retainer 24 abuts against the lip 22 such that the lip 22 entraps retainer 24 within the housing chamber 20.

Referring again to FIG. 1, the male part 14 is of conventional construction and comprises an elongated tube 30 having an annular bead 32 extending outwardly adjacent one end 34 of the male part 14. The male part 14, furthermore, is dimensioned so that, upon insertion through the open end 18 of the female housing 12, the annular bead 32 deflects the locking tabs 26 radially outwardly during insertion. Upon completion of insertion, the locking tabs 26 spring radially inwardly so that they engage a rearwardly facing surface 38 of the bead 32 thus securing the female part 12 and male part 14 together. Appropriate seals 40 are also provided between the male part 14 and female part 12 to ensure an fluid tight fitting of the coupling 10.

With reference now particularly to FIGS. 2–5, the retainer 24, which forms the novelty of the instant invention, is there shown in greater detail. The retainer 24 is constructed from an elongated band 42 of resilient material, such as spring steel. Furthermore, with the band in its undeflected or free state as shown in FIG. 2, the band 42 has a diameter substantially the same or slightly greater than the diameter of the female housing chamber 20.

Figures 3, 5:
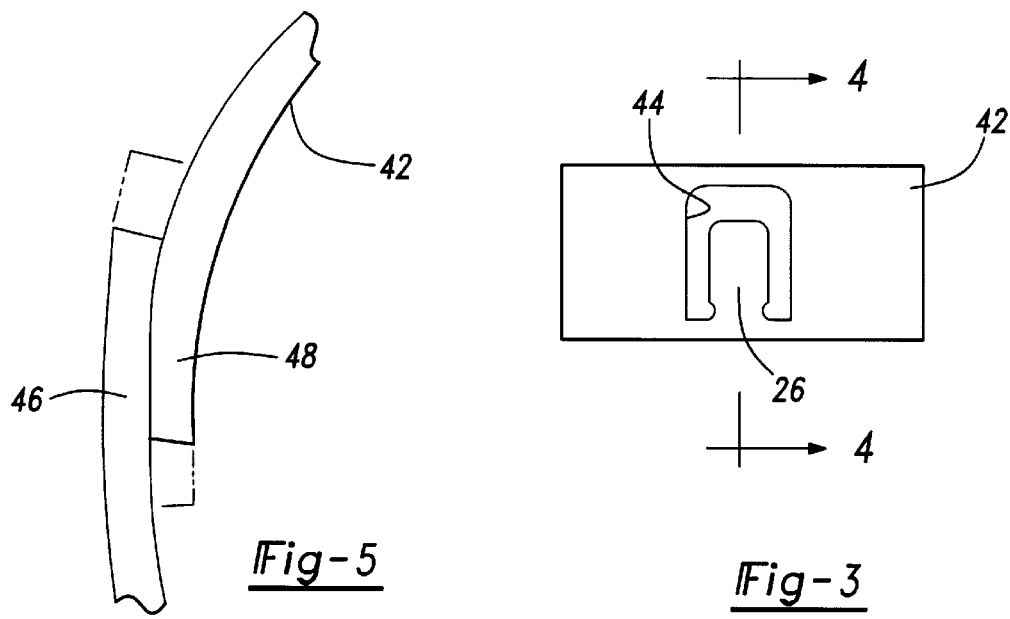
FIG. 3 is a side view illustrating a portion of the preferred embodiment of the retainer of the present invention.
FIG. 5 is a fragmentary enlarged end view of a portion of the retainer of the present invention.

As best shown in FIGS. 3 and 4, the locking tabs 26 preferably comprise stampings formed from the band 42. As such, a generally U-shaped cut-out 44 is formed in the band 42 for each locking tab 26.

With reference now to FIGS. 2 and 5, in order to maintain the band 42 in a substantially circular cross sectional shape despite radial inward compression, the band 42 is dimensioned so that its opposite ends 46 and 48 overlap each other by a small distance. Consequently, as the band 42 is compressed radially inwardly as indicated in phantom line in FIG. 5, the overlapping portions 46 and 48 of the band 42 retain the band in a substantially circular cross sectional shape despite such radial inward compression. Such circular configuration is maintained despite the reduced longitudinal length of the band 42 formed by the U-shaped cut-outs 44.

During the assembly of the quick connect coupling, the retainer 24 is radially inwardly compressed so that its diameter is less than the interior diameter of the lip 22 on the female housing 16. The retainer is then inserted into the female housing chamber 20, and upon release, expands radially outwardly to the position shown in FIG. 1 such that the retainer 24 is entrapped within the female housing 16 by the lip 22. Since the retainer 24 is retained in a circular cross sectional shape during its insertion into the female housing chamber 20, the retainer 24 maintains its circular shape following its radial expansion after release within the housing chamber 20.

From the foregoing, it can be seen that the present invention provides a quick connect coupling which overcomes the previously known disadvantages of the prior art devices. Having described my invention, however, many modifications thereto will become apparent to those skilled in the art to which it pertains without deviation from the spirit of the invention as defined by the scope of the appended claims.

I claim:

1. A quick connect coupling comprising:

a male part and a female part, said female part having a housing open at one end, said housing forming a generally cylindrical chamber adjacent to and aligned with said open end of said housing, said housing having an annular and radially inwardly projecting lip at said open end of said housing, a retainer constructed from an elongated band of a resilient material, said band being formed into a tubular cylindrical shape having a diameter at least as large as the diameter of said chamber, said band being dimensioned such that one end of said band overlies the other end of said band, a plurality of locking tabs secured to and extending radially inwardly from said band, said retainer being radially inwardly compressible and insertable into said open end of said housing such that, after insertion, said retainer expands radially outwardly so that an outer end of said retainer is entrapped by said lip, said male part having an elongated cylindrical tube with an annular bead adjacent one end, said end of said male part being insertable through said open end and into said chamber of said female housing so that said locking tabs engage an outwardly facing surface of said bead to thereby secure said male part and said female part together, wherein said band and said tabs are of a one piece metal construction and comprise a stamping in which each said tab forms a U-shaped opening in said band such that each end of each said tab is spaced axially inwardly from its adjacent side of said band so that each side of said band is linearly continuous between opposite ends of said band.

\* \* \* \* \*